July 7, 1959  A. A. MEDLOCK  2,893,331
UTENSIL
Filed Jan. 22, 1957  2 Sheets-Sheet 1

Alfred A. Medlock
INVENTOR.

BY *[signatures]*
Attorneys

July 7, 1959

A. A. MEDLOCK 2,893,331

UTENSIL

Filed Jan. 22, 1957

Alfred A. Medlock
INVENTOR.

BY *Clarence A. O'Brien
and Harvey B. Jackson*
Attorneys

United States Patent Office 2,893,331
Patented July 7, 1959

2,893,331

UTENSIL

Alfred A. Medlock, Biloxi, Miss.

Application January 22, 1957, Serial No. 635,190

3 Claims. (Cl. 107—30)

This invention relates to a kitchen utensil and more particularly to a utensil which is adapted for multi-purpose use.

An object of the present invention is to provide a metal or plastic container with a center chamber in which to place frozen juices, ice, lemons, tea or other foods or beverage or food or beverage mixes whereby upon application of pressure through the agency of a plunger in the chamber, the food or other material in the chamber is compressed and squeezed through a plurality of openings in the chamber.

A further object of the invention is to provide a utensil as described above wherein there is a removable screen insert that is used for straining, for example, when tea or coffee is made, the plunger being adapted to fit within the screen.

A further object of the invention is to provide a utensil wherein frozen fruit juices, vegetable juices, etc. are accommodated in the center chamber, together with a plunger, the container having lateral openings and the plunger having vanes at the bottom thereof so that upon application of pressure by the plunger and a turning motion of the plunger, the frozen juices will be forced out of the apertures in the chamber and into the proper amount of water that is in the body of the container. By moving the plunger up and down a few times, the water and frozen juices are homogenized, completely mixing the same without waiting for the frozen juice to melt.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
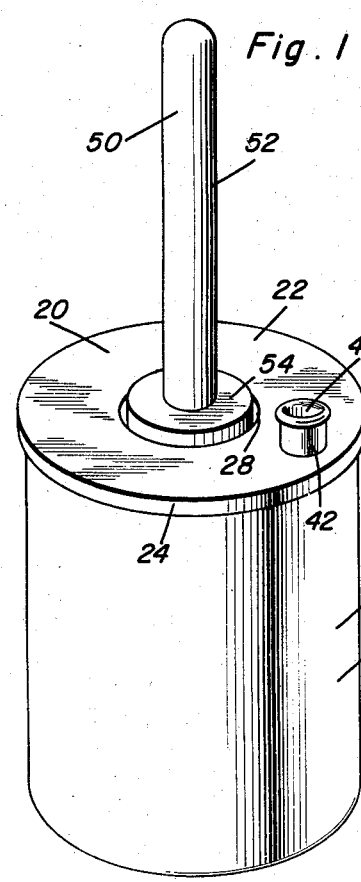
Figure 1 is a perspective view of a utensil which is constructed in accordance with the invention.

In the accompanying drawings there is a utensil 10 which is constructed in accordance with the invention. This utensil comprises a container 12 which may have a cylindrical side wall 14 and a bottom 16, the latter being spaced above the supporting surface, as a table, by means of the annular rib or bead 18 around the periphery of the bottom. It is preferred, although not essential, that the utensil be provided with a top 20, the latter being made of a flat plate 22 having a pair of concentric downturned cylindrical skirts 24 and 26 between which the upper edge of the side walls 14 is adapted to be fitted and frictionally held in place. The center of the plate 16 has a funnel-shaped wall 28 which is adapted to fit in the flared mouth 30 of sleeve 32, the latter enclosing a chamber 34 in which frozen foods, ice, tea, coffee, fresh fruit, etc. are adapted to be accommodated.

Sleeve 32 has a plurality of oval-shaped preferably vertically disposed openings 36 through which the contents of the chamber are adapted to pass. The lower end of the chamber 34 is closed by a bottom wall 38, this bottom wall being made as a part of the bottom 16 or attached to the bottom 16 of the container, as by rivet 40. Sleeve 32 is concentrically arranged with respect to the container 12 and is of approximately the same height thereof. Pouring spout 42 schematically represents any type of spout that the manufacturer desires to add to the closure or lid 20. A small plastic cover or metal cover 44 is separately attached to the pouring spout 42 by being engaged with the bead 46 around the edge thereof.

Plunger 50 is supplied with the utensil and is made of a handle 52 having a piston 54 at one end thereof. The piston has a plurality of curved vanes 56 on its lower face and is of such dimension as to fit within the chamber 34. The purpose of the plunger is to compress and squeeze the material in the chamber 34, expressing through the openings 36 and into the remainder of the body of the container which may have additional additive, as water, therein. Moreover, by oscillating and reciprocating the plunger 50 the entire contents of the container are admixed.

Figure 2:
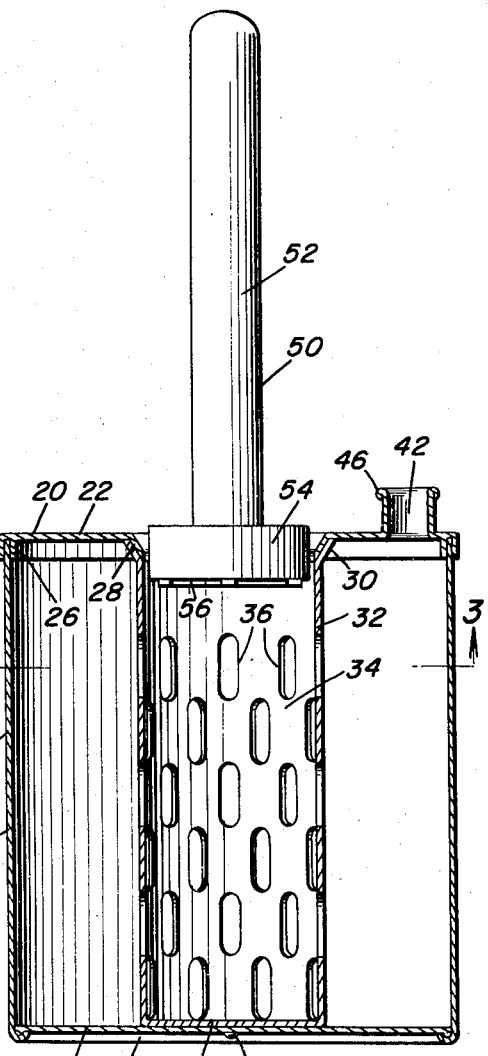
Figure 2 is a vertical sectional view of the utensil of Figure 1.
Figure 3:
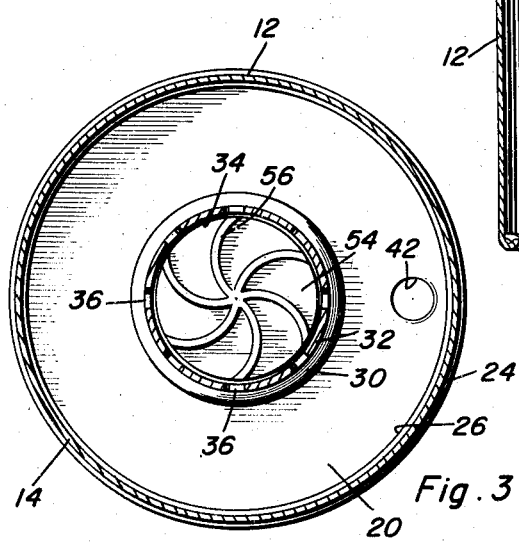
Figure 3 is a transverse sectional view taken on the line 3—3 of Figure 2.
Figure 6:
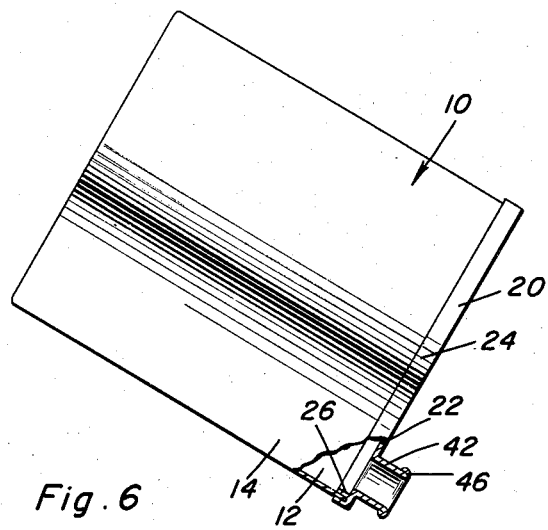
Figure 6 is a perspective view of the container with the plunger removed and showing the same in the pouring position.
Figure 4:
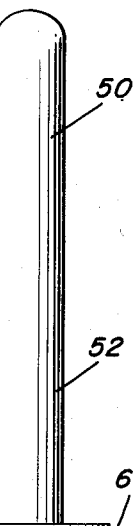
Figure 4 is a vertical sectional view of the utensil of Figure 2 but showing the screen attachment placed therein.
Figure 4:
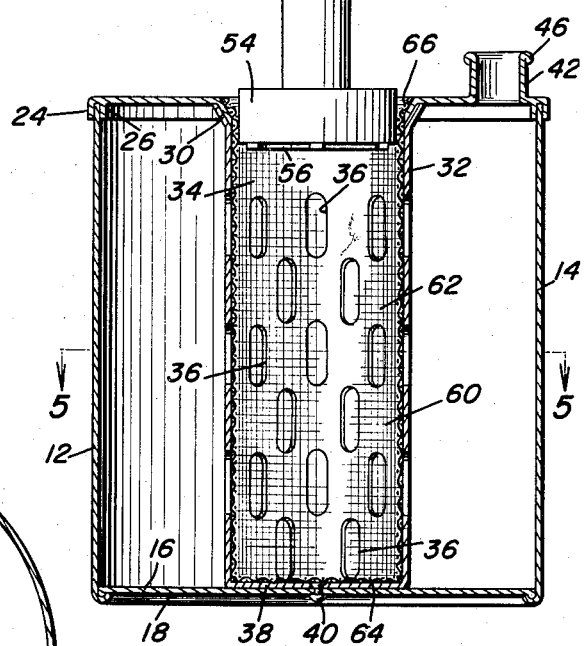
Figure 5:
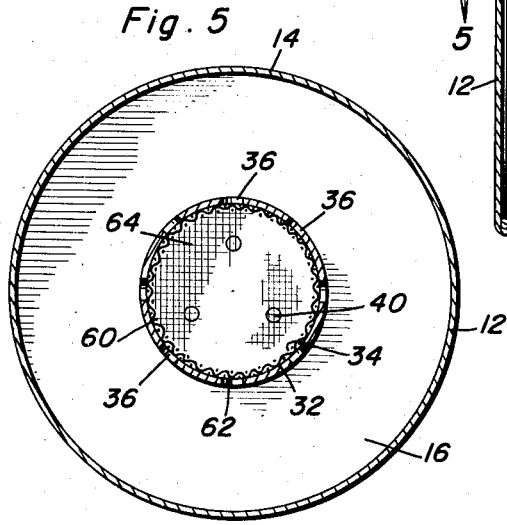
Figure 5 is a transverse sectional view taken on the line 5—5 of Figure 4.

Sometimes it is desired that the contents of the chamber 34 be retained in the chamber while liquid is moved therethrough. Making tea is one example of a number of products which are used in this way. Therefore, a strainer 60 is detachably connected with the chamber 34 and is supplied with the utensil. The strainer is made of screen and includes a cylindrical side wall 62 and a circular bottom wall 64 which fits on the bottom 38 of the chamber. The cylindrical side wall 62 fits against the inner surface of the sleeve 32, and the upper open end of the strainer is flared outwardly forming a funnel 66 which rests against the inner surface of the funnel 28. In use of the utensil with the strainer 60, the same procedure is followed as described in connection with the utensil of Figure 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A utensil comprising a liquid container, an inner vessel having a chamber for a food product in said container, said vessel having a side wall provided with a plurality of openings establishing registry between the interior of the container and vessel, a plunger which includes a piston mounted for reciprocation in said vessel chamber and adapted to express the food product through said openings in response to reciprocation thereof, said piston having a working surface at the bottom thereof, and vanes on said piston surface to further admix the materials in said chamber with liquid in said container.

2. The combination of claim 1 wherein there is a closure for said container and having a central opening registering with said chamber and through which a part of said plunger is adapted to pass, and a screen covering said openings in said vessel wall.

3. The utensil of claim 1 wherein there is a screen juxtaposed to said vessel side wall and covering said openings in said vessel side wall.

References Cited in the file of this patent

UNITED STATES PATENTS

| 1,018,684 | Smith | Feb. 27, 1912 |
| 1,053,015 | Darlington | Feb. 11, 1913 |

FOREIGN PATENTS

| 11,127 | Great Britain | Aug. 15, 1887 |
| 145,045 | Australia | Feb. 8, 1952 |
| 442,342 | Italy | Nov. 22, 1948 |
| 569,372 | Germany | Feb. 1, 1933 |